(12) United States Patent
Kahn et al.

(10) Patent No.: US 9,071,954 B2
(45) Date of Patent: Jun. 30, 2015

(54) WIRELESS OPTIMIZED CONTENT DELIVERY NETWORK

(75) Inventors: Colin Kahn, Morris Plains, NJ (US); Sankaranarayanan Sathyanarayan, Stewartsville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 969 days.

(21) Appl. No.: 13/118,795

(22) Filed: May 31, 2011

(65) Prior Publication Data

US 2012/0307635 A1 Dec. 6, 2012

(51) Int. Cl.
  *H04L 12/26* (2006.01)
  *H04L 12/28* (2006.01)
  *H04W 4/18* (2009.01)
  *H04L 12/24* (2006.01)

(52) U.S. Cl.
  CPC .............. *H04W 4/18* (2013.01); *H04L 41/5067* (2013.01); *H04L 43/065* (2013.01)

(58) Field of Classification Search
  CPC ...... H04L 47/10; H04L 49/90; H04L 12/5693
  USPC ......... 370/229, 230, 428, 429, 465, 468, 485, 370/486
  See application file for complete search history.

(56) References Cited

U.S. PATENT DOCUMENTS

| | | | |
|---|---|---|---|
| 5,754,733 A | 5/1998 | Gardner et al. | |
| 6,041,316 A | 3/2000 | Allen | |
| 6,826,593 B1 | 11/2004 | Acharya et al. | |
| 2004/0098748 A1 | 5/2004 | Bo et al. | |
| 2004/0240390 A1 | 12/2004 | Seckin | |
| 2010/0027487 A1 | 2/2010 | Ihm et al. | |
| 2010/0118114 A1 | 5/2010 | Hosseini et al. | |
| 2011/0032324 A1 | 2/2011 | George et al. | |
| 2011/0255555 A1* | 10/2011 | Alexander | 370/468 |
| 2011/0289126 A1* | 11/2011 | Aikas et al. | 707/827 |
| 2012/0005251 A1* | 1/2012 | Xie et al. | 709/201 |

FOREIGN PATENT DOCUMENTS

CA 2715362 A1 3/2011

* cited by examiner

*Primary Examiner* — Michael Thier
*Assistant Examiner* — Feben M Haile
(74) *Attorney, Agent, or Firm* — Ryan, Mason & Lewis, LLP

(57) ABSTRACT

A content delivery network of a communication system comprises a memory configured to store at least one secondary object for each of at least a subset of a plurality of primary objects accessible via a wireless network of the system. An associated processing device of the content delivery network is configured to receive a request from a user device for delivery of content comprising at least a given one of the primary objects, to select a particular object from the given primary object and its one or more corresponding secondary objects based on network congestion measurement information obtained for the wireless network, and to provide the selected particular object to the user device via the wireless network. A plurality of different secondary objects may be stored for the given primary object with each such primary or secondary object having a different level of resource requirements for delivery over the wireless network.

21 Claims, 3 Drawing Sheets

WIRELESS OPTIMIZED CONTENT DELIVERY NETWORK

TECHNICAL FIELD

The present invention relates generally to communication systems that include wireless networks, and more particularly to techniques for delivery of content over a wireless network to user devices in a communication system.

BACKGROUND OF THE INVENTION

This section introduces aspects that may be helpful in facilitating a better understanding of the invention. Accordingly, the statements of this section are to be read in this light and are not to be understood as admissions about what is in the prior art or what is not in the prior art.

Many content delivery networks were originally designed for delivery of content over wired connections rather than wireless connections. Such content delivery networks often comprise widely-deployed servers or other processing devices that provide sources of content close to the edge of an access network. More recently, content providers have been moving towards providing cloud-based application hosting environments with support for computing, storage and connectivity.

Conventional content delivery networks often use techniques like adaptive streaming that attempt to match the rate at which content is delivered to a given user device to the available bandwidth sensed by an application running on that device. In a typical conventional arrangement, a content delivery network stores and delivers objects that are identified by respective uniform resource indicators (URIs). The content delivery network receives a URI for an object such as embedded web content and responds by delivering the appropriate object.

SUMMARY OF THE INVENTION

Various illustrative embodiments provide content delivery networks that are optimized for delivery of content over wireless networks.

In one embodiment, a content delivery network of a communication system comprises at least one processing device and an associated memory. The memory is configured to store at least one secondary object for each of at least a subset of a plurality of primary objects accessible via a wireless network of the system. The associated processing device of the content delivery network is configured to receive a request from a user device for delivery of content comprising at least a given one of the primary objects, to select a particular object from the given primary object and its one or more corresponding secondary objects based on network congestion measurement information obtained for the wireless network, and to provide the selected particular object to the user device via the wireless network. A plurality of different secondary objects may be stored for the given primary object with each such primary or secondary object having a different level of resource requirements for delivery over the wireless network.

By way of example, the network congestion measurement information may comprise user device measurements that are aggregated over a specified cell area of the wireless network and are further consolidated with network state information of the wireless network. The network congestion measurement information may additionally or alternatively comprise one or more of network element processor occupancy, network element dropped packet rate, network element ingress queue depth, air-interface slot utilization, packet round-trip time, and number of active user devices waiting for service.

The illustrative embodiments provide considerable advantages. For example, a content delivery network configured in accordance with one or more of these embodiments dynamically adapts to variations in technology constraints and operating conditions of a wireless network, thereby enhancing the subscriber experience and the throughput performance of the system. As another example, one or more of these illustrative arrangements advantageously avoids the need for user device application providers to modify their applications to interface with particular types of network equipment in the wireless network.

These and other features and advantages of the present invention will become more apparent from the accompanying drawings and the following detailed description.

DETAILED DESCRIPTION OF THE INVENTION

The present invention will be described herein in conjunction with illustrative embodiments of communication systems, wireless networks, content delivery networks, processing devices and associated content delivery processes. It should be understood, however, that the invention is not limited to use with the particular systems, networks, devices and processes described, but is instead more generally applicable to any communication system application in which it is desirable to provide improved performance in delivery of content over a wireless network.

Figure 1:
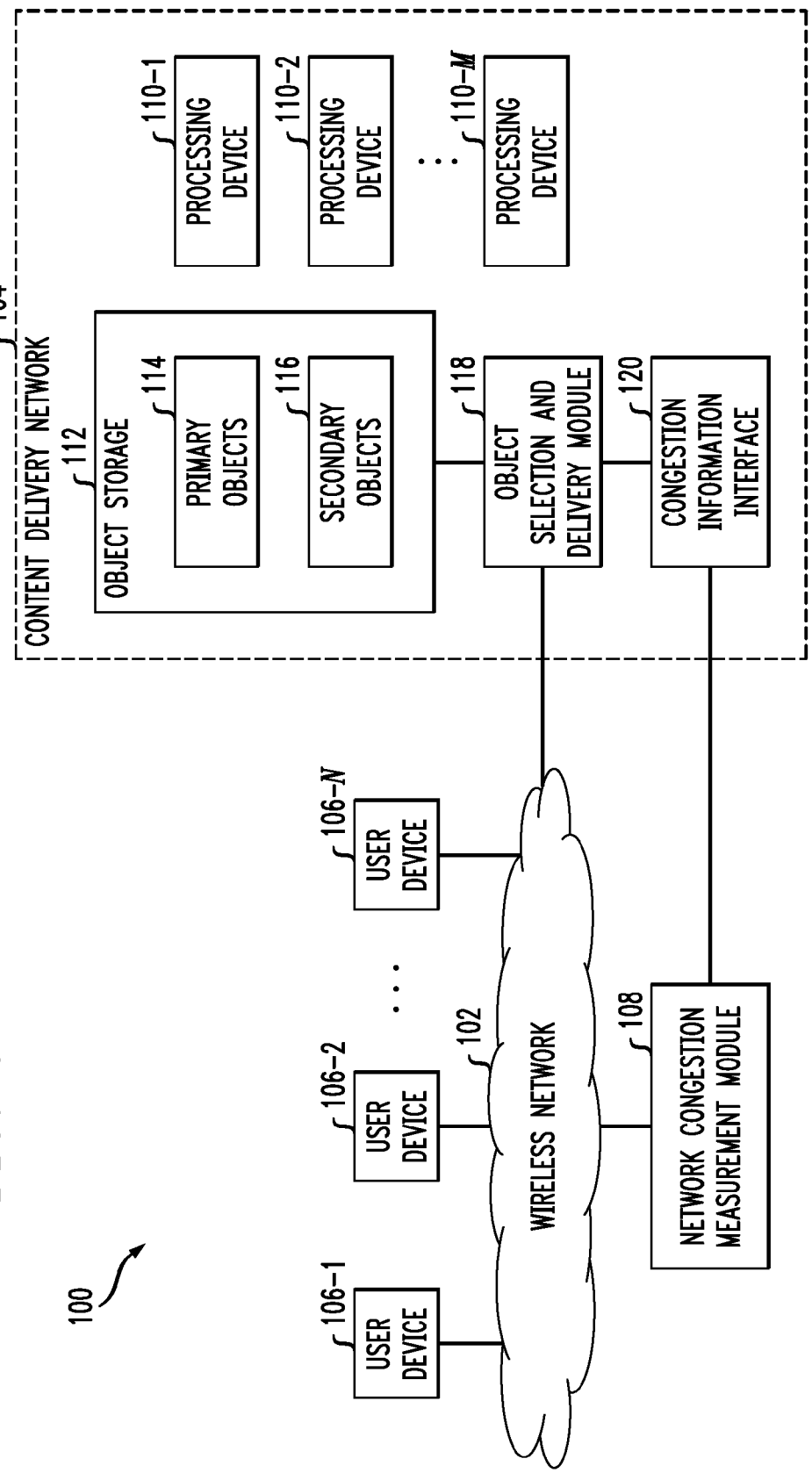
FIG. 1 shows a communication system with wireless optimized content delivery in a first embodiment of the invention.

FIG. 1 shows an illustrative embodiment of a communication system 100 comprising a wireless network 102 and a content delivery network 104. The content delivery network 104 is coupled to the wireless network 102 and is configured to communicate with an arbitrary number of user devices 106-1, 106-2, . . . 106-N over the wireless network 102. Associated with the wireless network 102 is a network congestion measurement module 108. Although this module is shown as separate from the wireless network 102 in the present embodiment, it may be at least partially incorporated into network equipment of the wireless network in other embodiments. The network congestion measurement module 108 provides network congestion measurement information for the wireless network 102 to the content delivery network 104.

The wireless network 102 may be configured in accordance with any of a number of known wireless communication standards, including without limitation GPRS, UMTS, HSPA, LTE, WiFi, WiMax, 3G1X, EV-DO/HRPD/eHRPD, Bluetooth and Zigbee, and in a given embodiment may support multiple such standards. The wireless network 102 may therefore comprise multiple separate sub-networks each configured in accordance with a different standard.

In one possible implementation, the wireless network 102 may comprise an arrangement of multiple base stations, controllers and other associated network elements configured to support communication with the user devices 106 over one or more air interfaces. The wireless network 102 may also comprise other types of network elements, such as routers and switches, for communicating with the processing devices and other components of the content delivery network 104. The module 108 may be implemented at least in part within any such network element of the wireless network 102.

The content delivery network 104 comprises a plurality of processing devices 110-1, 110-2, . . . 110-M and object storage 112 which includes storage for primary objects 114 and secondary objects 116. Each of the processing devices 110 may comprise a server or computer having at least one processor coupled to at least one associated memory. Such a processing device will generally also comprise a transceiver which allows the device to communicate with other processing devices or system components. A processor within a given one of the processing devices 110 may comprise a microprocessor, a microcontroller, an application-specific integrated circuit (ASIC), a field-programmable gate array (FPGA) or other type of processor, as well as portions or combinations of such devices. An associated memory may comprise an electronic random access memory (RAM), a read-only memory (ROM), a disk-based memory, or other type of storage device, as well as portions or combinations of such devices.

The processor and memory may be used in storage and execution of one or more software programs for providing optimization functionality for content delivery over wireless network 102 as described herein. The memory may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination.

It is therefore apparent that the processing devices 110 may comprise well-known conventional circuitry suitably modified to operate in the manner described herein. Conventional aspects of such circuitry are well known to those skilled in the art and therefore will not be described in detail herein.

Although illustratively shown as separate from the processing devices 110, the object storage 112 may be implemented at least in part in a memory comprising portions of the memories of respective ones of the processing devices 110. The term "memory" as used herein is therefore intended to be broadly construed, so as to encompass, for example, one or more processing device memories or separate disk arrays, network-attached storage devices, or other types of storage devices, in any combination.

The network elements of the wireless network 102 may communicate with processing devices 110 or other components of the content delivery network 104 using other types of networks that are not explicitly shown in the figure. These other types of networks may comprise, for example, a wide area network such as the Internet, a metropolitan area network, a local area network, a cable network, a telephone network, a satellite network, as well as portions or combinations of these or other networks. The term "network" as used herein is therefore intended to be broadly construed.

A primary or secondary object stored in object storage 112 may comprise an image file, a video file, an audio file, a multimedia file, a data file, a web page or any other type or arrangement of content deliverable from the content delivery network 104 to one or more of the user devices 106 over the wireless network 102. For each of at least a subset of a plurality of primary objects accessible via the wireless network 102, the content delivery network stores at least one secondary object. The secondary object may be, for example, a lower-resolution version of a full-resolution multimedia file which serves as the corresponding primary file. Transmission of the secondary object over the wireless network 102 generally consumes fewer network resources than does transmission of the primary object. Thus, for a given primary object, a plurality of different secondary objects may be stored, with each such primary or secondary object having a different level of resource requirements for delivery over the wireless network 102.

The content delivery network 104 further comprises an object selection and delivery module 118 and a congestion information interface 120. The congestion information interface 120 is configured to obtain network congestion measurement information for the wireless network 102 via the module 108. The network congestion measurement information may comprise, for example, user device measurements that are aggregated over a specified cell area of the wireless network and are further consolidated with network state information of the wireless network. As more particular examples, the network congestion measurement information may comprise one or more of network element processor occupancy, network element dropped packet rate, network element ingress queue depth, air interface slot utilization, packet round-trip time, and number of active user devices waiting for service. The network congestion measurement information may be obtained via an application programming interface (API) associated with a network element of the wireless network 102 that is utilized to implement at least a portion of the network congestion measurement module 108.

Network congestion measurement information may also or alternatively indicate differences in congestion between different available network types. For example, if both UMTS and LTE wireless networks are available for communicating with a given user device, the network congestion measurement information may indicate the relative congestion of the UMTS and LTE networks (e.g., the UMTS network is congested but the LTE network is not congested).

The object selection and delivery module 118 selects between primary and secondary objects for delivery to the user devices 106 responsive to corresponding primary object requests, with the selection being based on the network congestion measurement information obtained for the wireless network 102. Generally, the content delivery network 104 receives a request for a given primary object, which may be identified by a URI or other type of identifier, and the module 118 selects a particular object from the given primary object and its one or more corresponding secondary objects based on the network congestion measurement information obtained for the wireless network, and delivers the selected particular object to the user device via the wireless network.

The object selection and delivery module 118 may be implemented at least in part using software that runs on a processor of one or more of the processing devices 110. Also, the congestion information interface 120 may be implemented at least in part utilizing a transceiver of one or more of the processing devices 110. In other embodiments, there may be separate modules 118 and interfaces 120 associated with each of a plurality of the processing devices 110. Also, separate object storage 112 may be provided within each of the processing devices.

It is therefore to be appreciated that a content delivery network as disclosed herein may be implemented using modules, interfaces, devices and components other than those specifically shown in the exemplary arrangement of FIG. 1.

We have recognized that conventional content delivery networks are generally not fully optimized for wireless delivery. For example, a conventional content delivery network is typically unaware of the constraints imposed by the capabilities of the particular technology utilized by the wireless network over which the content is delivered, as well as the current operating conditions of that wireless network, and in any event is unable to adapt to variations in those constraints or conditions in a manner that would improve the subscriber experience or the throughput performance of the system.

It is possible to provide such information to user device applications via explicit APIs of particular types of network equipment. An approach of this type is problematic, however, because user device application providers would have to modify their applications to use the APIs. Unfortunately, large-scale user device application providers that support both wired and wireless connections over a wide variety of different access networks would have insufficient motivation to make such API-based customizations in their applications only to support particular types of network equipment.

The present embodiment advantageously overcomes these drawbacks at least in part by providing a mechanism for dynamic selection between primary and secondary objects based on network congestion measurement information obtained for the wireless network 102 over which the objects will be delivered.

The operation of the content delivery network 104 in an illustrative embodiment will now be described with reference to the flow diagram of FIG. 2. The content delivery process shown in the diagram includes steps 200 through 210, which in the present embodiment may be assumed to be performed utilizing at least components 118 and 120 of the content delivery network 104.

In step 200, one or more secondary objects are stored for each of a number of primary objects accessible via the wireless network 102. Alternatively, one or more secondary objects may be stored for each of only a subset of a particular set of primary objects. The primary and secondary objects are stored in respective elements 114 and 116 of object storage 112. As indicated above, a plurality of different secondary objects may be stored for a given primary object with each such primary or secondary object having a different level of resource requirements for delivery over the wireless network 102. The given primary object and its one or more corresponding secondary objects may be stored in a common cache memory of the content delivery network, where such a memory comprises at least a portion of the object storage 112. The one or more secondary objects corresponding to the given primary object may be provided to the content delivery network 104 by the same content provider that also provides the given primary object, or may be generated directly by a component of the content delivery network as needed.

In step 202, a request is received from one of the user devices 106 for delivery of content comprising one or more of the primary objects. The request may be received over a conventional network connection and processed by module 118, or by an associated one of the processing devices 110.

In step 204, for a given primary object of the requested content, a particular object is selected from among the given primary object and its one or more corresponding secondary objects based on network congestion measurement information obtained for the wireless network 102. As indicated previously, the network congestion measurement information may comprise user device measurements that are aggregated over a specified cell area and consolidated with network state information of the wireless network, including one or more of network element processor occupancy, network element dropped packet rate, network element ingress queue depth, air interface slot utilization, packet round-trip time, and number of active user devices waiting for service. This is in contrast to conventional arrangements, which as mentioned above include adaptive streaming techniques that attempt to match the rate at which content is delivered to a given user device to the available bandwidth sensed by an application running on that device.

The selection operation performed in step 204 may additionally or alternatively be based on criteria established at least in part by a content provider that provides the given primary object and possibly also its one or more associated secondary objects. For example, the selection operation may take into account one or more detected attributes of the requesting user device, such as user device processor occupancy, memory capacity, available memory, battery status, power status (e.g., plugged in or not), roaming status, and number of active applications. A result of the selection operation may be logged for subsequent reporting to the content provider.

In step 206, the selected particular object is provided to the requesting user device 106 via the wireless network 102. Delivery of the selected object may be over a conventional network connection. The present embodiment does not require the use of any particular communication mechanism between wireless network 102 and content delivery network 104. As mentioned previously, those system entities may be interconnected using any of a variety of different types of local or wide area networks.

In step 208, a determination is made as to whether or not additional objects are to be delivered to the user device 106 as part of the requested content. If there are no such additional objects, the requested content delivery is complete, as indicated in step 210. Otherwise, steps 204, 206 and 208 are repeated for one or more additional primary objects associated with the request received in step 202.

Figure 2:
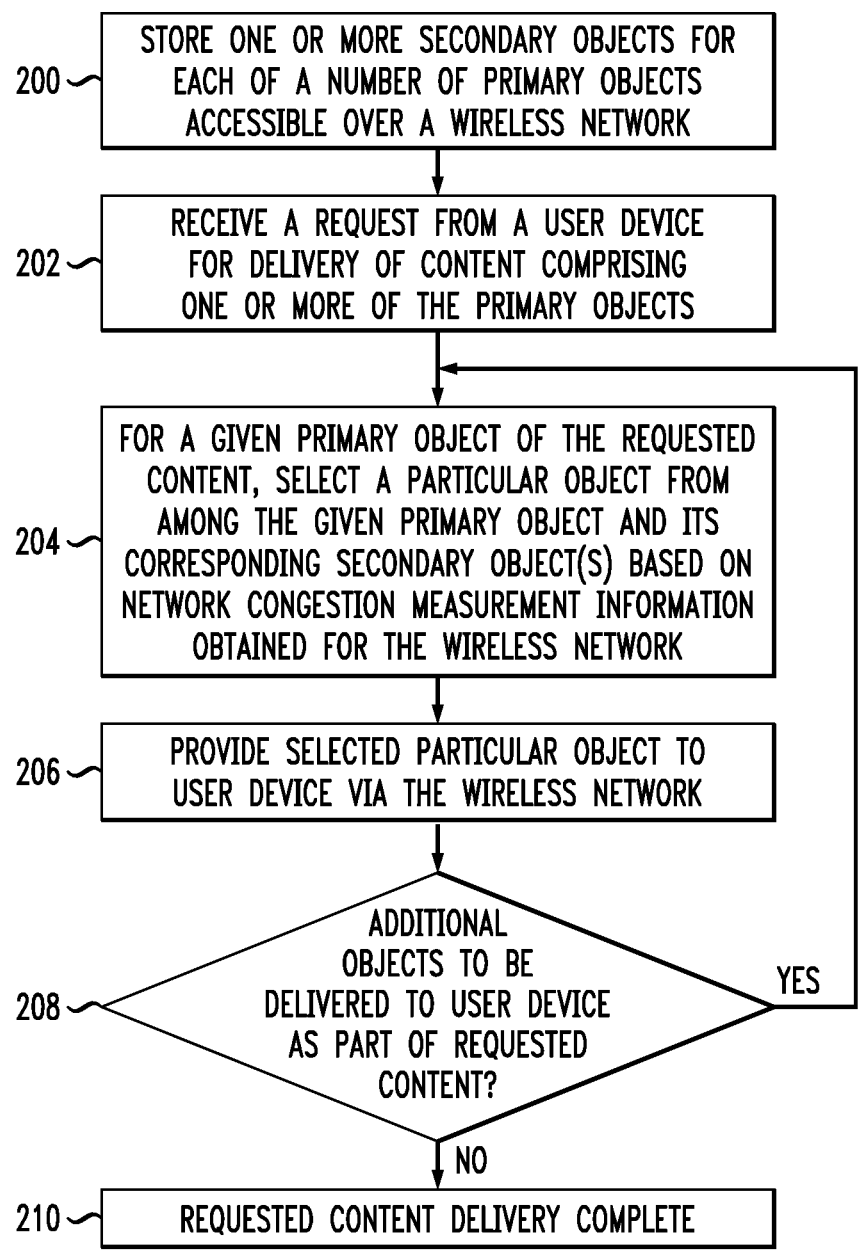
FIG. 2 is a flow diagram of a content delivery process of the FIG. 1 system.

The particular process steps and their ordering as shown in the flow diagram of FIG. 2 are presented by way of illustrative example only, and additional or alternative steps may be used in other embodiments. Also, the ordering of the process steps may be varied, and certain steps shown as being performed serially may be performed at least in part concurrently with one or more other steps.

Figure 3:
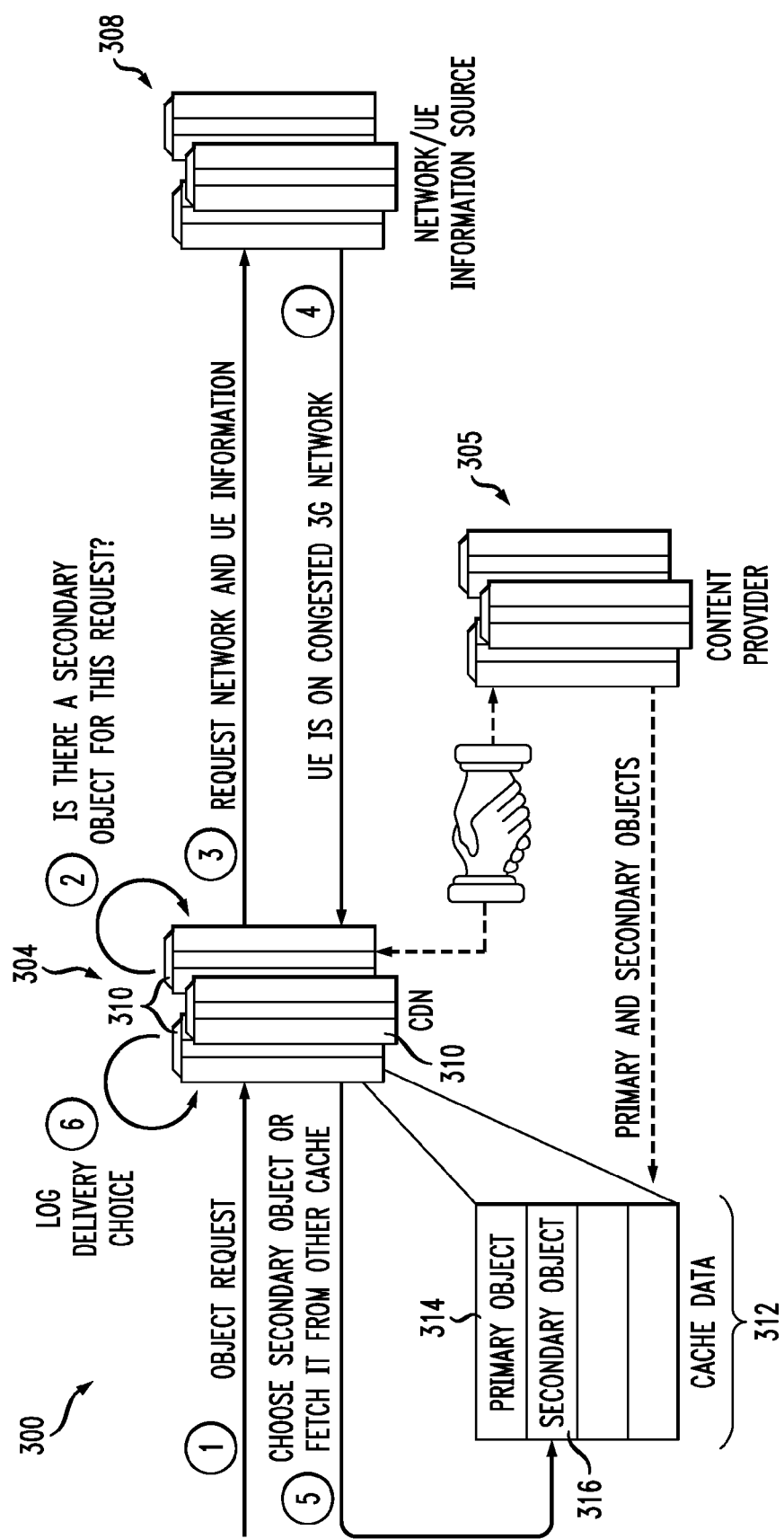
FIG. 3 is a diagram illustrating the operation of a communication system with wireless optimized content delivery in another embodiment of the invention.

Another illustrative embodiment of the invention is shown in FIG. 3. In this embodiment, a communication system 300 comprises a content delivery network or CDN 304 which communicates with a content provider 305 and a network and user device information source 308. The content provider 305 may be an advertiser, an application provider, or other type of content provider.

Each of the system entities 304, 305 and 308 comprises a plurality of processing devices 310. Associated with one or more of the processing devices 310 of the content delivery network 304 is a cache memory 312 used to store for a given primary object 314 one or more secondary objects 316. In this embodiment, the primary and secondary objects are provided to the content delivery network 304 by the content provider 305. The information source 308 may comprise a wireless network element or associated module such as the network congestion measurement module 108. The user devices in this embodiment are also more specifically referred to as user equipment or UE.

The content delivery network 304 of the communication system 300 is advantageously configured to provide wireless optimized content delivery to a plurality of user devices such as devices 106 associated with wireless network 102. As in the embodiments described previously, the content delivery network 304 will under certain conditions substitute for a given requested primary object an alternative object for delivery to the requesting user device, as selected from one or more secondary objects associated with that primary object. Such an arrangement not only enhances the subscriber experience and the throughput performance of the system, it also avoids the need for user device application providers to modify their applications to interface with APIs of particular types of network equipment in the wireless network.

The substitute object is selected for delivery when conditions associated with the wireless network and possibly one or more of its user devices are such that delivery of the primary object would adversely impact the subscriber experience or contribute to excessive loading on the wireless network. For example, the content delivery network object substitution process may select a static picture advertisement as a secondary object for delivery to a subscriber in place of a video advertisement which is the corresponding requested primary object, based on network congestion measurement information obtained for the wireless network. As noted previously, such network congestion measurement information may be obtained via APIs of one or more network elements of the wireless network. This involves only a relatively simple modification to the network elements, but allows a large number of user device applications to be provided with a wireless optimized content delivery service.

Referring again to FIG. 3, the diagram also shows steps involved in an exemplary content delivery process. The steps are more particularly denoted as step 1 through step 6 in the diagram. This process assumes that a business agreement is first established between a wireless service provider or other operator of the content delivery network 304 and the content provider 305. The agreement may specify that the content delivery network operator will optimize their content delivery on wireless networks within the domain of the operator by substituting content provider approved alternative content when warranted by poor wireless network or user device conditions. The agreement may further stipulate the conditions under which an object substitution will take place. As noted previously, the object substitution improves the subscriber experience by ensuring that the object sizes provided by the content delivery network are compatible with the current capabilities and conditions of the wireless network and its active user devices. In this embodiment, the primary and secondary objects are provided by the content provider 305. Again, the user devices are denoted as user equipment or UE.

In step 1, the content delivery network 304 receives a request to deliver content to a particular UE. This request comprises a request for at least one primary object.

In step 2, the content delivery network checks to see if a secondary object is stored for the primary object. The secondary object in the present embodiment is assumed to be stored in the same cache 312 as the corresponding primary object, but may alternatively be stored in a separate cache or other memory accessible to the content delivery network.

In step 3, if a secondary object is available for the requested primary object, the content delivery network 304 uses one or more network element APIs to request network and UE information from the information source 308.

In step 4, the content delivery network 304 receives information from source 308 indicating that the requesting UE is on a congested wireless network, which may be a 3G network or other type of wireless network. This information may include network congestion measurement information of the type described previously herein, as well as one or more detected attributes of the requesting user device, such as user device processor occupancy, memory capacity, available memory, battery status, power status, roaming status, and number of active applications.

In step 5, based on the received information, the content delivery network 304 chooses either the primary object or a corresponding secondary object for delivery to the requesting UE. This selection process may be based at least in part on criteria defined by the content provider 305.

In step 6, the content delivery network 304 logs the delivery choice of primary or secondary object in a memory of one of the processing devices 310 for subsequent reporting to the content provider 305.

As in the case of the FIG. 2 flow diagram, the particular process steps shown in the FIG. 3 diagram are presented by way of illustrative example only, and may be varied in other embodiments.

As mentioned above, embodiments of the present invention may be implemented at least in part in the form of one or more software programs that are stored in a memory or other computer-readable storage medium of a processing device of a content delivery network. As an example, content delivery network components such as the object selection and delivery module 118 of FIG. 1 may be implemented at least in part using one or more software programs.

Of course, numerous alternative arrangements of hardware, software or firmware in any combination may be utilized in implementing these and other system elements in accordance with the invention. For example, embodiments of the present invention may be implemented in one or more ASICs, FPGAs or other types of integrated circuit devices, in any combination. Such integrated circuit devices, as well as portions or combinations thereof, are examples of "circuitry" as the latter term is used herein.

It should again be emphasized that the embodiments described above are for purposes of illustration only, and should not be interpreted as limiting in any way. Other embodiments may use different types of wireless and content delivery networks, processing device and memory configurations, and object selection processes, depending on the needs of the particular application. Alternative embodiments may therefore utilize the techniques described herein in a wide variety of other contexts in which it is desirable to provide improved performance in terms of delivering content over a wireless network by selection of alternative objects based on network congestion measurement information. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising the steps of:
    storing at least one secondary object for each of at least a subset of a plurality of primary objects accessible via a wireless network;
    receiving a request from a given user device for delivery of content comprising at least a given one of the primary objects;
    selecting a particular object from the given primary object and its one or more corresponding secondary objects based on network congestion measurement information obtained for the wireless network and one or more detected attributes of the given user device; and
    providing the selected particular object to the given user device via the wireless network;
    wherein the given primary object and its one or more corresponding secondary objects have respective different levels of resource requirements for delivery over the wireless network;

wherein said different levels are associated with respective different amounts of network resources utilized for transmission of the given primary object and its one or more corresponding secondary objects; and wherein the network congestion measurement information comprises measurements from a plurality of user devices that are aggregated over a specified cell area of the wireless network and are further consolidated with network state information of the wireless network.

2. The method of claim 1 wherein the storing step comprises storing a plurality of different secondary objects for the given primary object with each such primary or secondary object having a different level of resource requirements for delivery over the wireless network.

3. The method of claim 1 wherein the selecting and providing steps are repeated for each of one or more additional primary objects that are also part of the requested content.

4. The method of claim 1 wherein the storing, receiving, selecting and providing steps are implemented in at least one processing device of a content delivery network.

5. The method of claim 4 wherein the storing step comprises storing the given primary object and its one or more corresponding secondary objects in a common cache memory of the content delivery network.

6. The method of claim 4 wherein said one or more secondary objects corresponding to the given primary object are provided to the content delivery network by a content provider that also provides the given primary object.

7. The method of claim 1 wherein the step of selecting from the given primary object and its one or more corresponding secondary objects comprises selecting based on criteria established at least in part by a content provider that provides at least the given primary object.

8. The method of claim 1 wherein the detected attributes of the user device comprise one or more of user device processor occupancy, memory capacity, available memory, battery status, power status, roaming status, and number of active applications.

9. The method of claim 1 further comprising the step of logging a result of the selecting step for subsequent reporting to a content provider.

10. The method of claim 1 wherein the network congestion measurement information is obtained via an application programming interface associated with a network element of the wireless network.

11. The method of claim 1 wherein the network congestion measurement information comprises one or more of network element processor occupancy, network element dropped packet rate, network element ingress queue depth, air-interface slot utilization, packet round-trip time, and number of active user devices waiting for service.

12. The method of claim 1 wherein the subset of the plurality of primary objects comprises two or more primary objects.

13. An article of manufacture comprising a non-transitory computer-readable storage medium having embodied therein executable program code that when executed by a processing device of a content delivery network causes the processing device to perform the steps of the method of claim 1.

14. The method of claim 1 wherein the given primary object comprises a multimedia file and its one or more corresponding secondary objects comprises respective lower-resolution versions of the multimedia file.

15. The method of claim 1 wherein the given primary object and its one or more corresponding secondary objects comprises different versions of the same multimedia content.

16. An apparatus comprising:
a memory configured to store at least one secondary object for each of at least a subset of a plurality of primary objects accessible via a wireless network; and
at least one processing device associated with the memory and configured to receive a request from a given user device for delivery of content comprising at least a given one of the primary objects, to select a particular object from the given primary object and its one or more corresponding secondary objects based on network congestion measurement information obtained for the wireless network and one or more detected attributes of the given user device, and to provide the selected particular object to the given user device via the wireless network;
wherein the given primary object and its one or more corresponding secondary objects have respective different levels of resource requirements for delivery over the wireless network;
wherein said different levels are associated with respective different amounts of network resources utilized for transmission of the given primary object and its one or more corresponding secondary objects; and
wherein the network congestion measurement information comprises measurements from a plurality of user devices that are aggregated over a specified cell area of the wireless network and are further consolidated with network state information of the wireless network.

17. The apparatus of claim 16 wherein said one or more secondary objects corresponding to the given primary object are provided for storage in the memory by a content provider that also provides the given primary object.

18. The apparatus of claim 16 wherein the selection from the given primary object and its one or more corresponding secondary objects comprises selection based on criteria established at least in part by a content provider that provides at least the given primary object.

19. The apparatus of claim 16 wherein the processing device comprises circuitry for performing object selection and delivery.

20. The apparatus of claim 16 wherein the apparatus is implemented in a content delivery network.

21. A communication system comprising:
a wireless network;
a content delivery network coupled to the wireless network and configured to communicate with a user device over the wireless network;
wherein the content delivery network is further configured to store at least one secondary object for each of at least a subset of a plurality of primary objects accessible via the wireless network, to receive a request from a given user device for delivery of content comprising at least a given one of the primary objects, to select a particular object from the given primary object and its one or more corresponding secondary objects based on network congestion measurement information obtained for the wireless network and one or more detected attributes of the given user device, and to provide the selected particular object to the given user device via the wireless network;
wherein the given primary object and its one or more corresponding secondary objects have respective different levels of resource requirements for delivery over the wireless network;
wherein said different levels are associated with respective different amounts of network resources utilized for transmission of the given primary object and its one or more corresponding secondary objects; and wherein the network congestion measurement information comprises measurements from a plurality of user devices that are aggregated over a specified cell area of the wireless network and are further consolidated with network state information of the wireless network.

* * * * *